United States Patent [19]

Durchenwald

[11] Patent Number: 4,696,387

[45] Date of Patent: Sep. 29, 1987

[54] WORKPIECE ROLLOVER APPARATUS

[75] Inventor: Larry D. Durchenwald, Cedar Falls, Iowa

[73] Assignee: Deere & Company, Moline, Ill.

[21] Appl. No.: 854,284

[22] Filed: Apr. 21, 1986

[51] Int. Cl.⁴ .............................................. B65G 47/24

[52] U.S. Cl. .................................... 198/394; 198/407; 198/410; 198/626; 198/690.1; 414/757; 414/774; 414/784

[58] Field of Search ............... 198/379, 381, 344, 394, 198/382, 403, 402, 404, 406, 407, 408, 409, 410–413, 416, 456, 468.5, 463.2, 472.1, 575–577, 604, 606, 626, 690.1, 803.6, 805, 463.3, 812, 463.5, 854, 468.6, 468.11; 414/757, 759, 769, 774, 775, 784

[56] References Cited

U.S. PATENT DOCUMENTS

| | | | |
|---|---|---|---|
| 2,120,315 | 6/1938 | Spellacy et al. | 198/379 X |
| 2,157,642 | 5/1939 | Vosler | 198/379 |
| 2,508,368 | 5/1950 | Borkmann | 198/415 |
| 2,939,569 | 6/1960 | Roach et al. | 198/412 X |
| 3,080,957 | 3/1963 | Wiggins et al. | 198/379 |
| 3,883,007 | 5/1975 | Hirschboeck | 414/784 X |
| 3,944,063 | 3/1976 | Lederer . | |
| 3,993,200 | 11/1976 | Ide | 198/412 X |
| 4,085,839 | 4/1978 | Crawford | 198/411 X |
| 4,122,938 | 10/1978 | Walz et al. . | |
| 4,156,482 | 5/1979 | Tomlinson et al. . | |
| 4,346,800 | 8/1982 | Bennett et al. | 198/412 |
| 4,471,865 | 9/1984 | Johnson | 198/415 X |
| 4,499,990 | 2/1985 | Fishback | 198/411 |

*Primary Examiner*—Robert J. Spar
*Assistant Examiner*—Lyle Kimms

[57] ABSTRACT

An apparatus for rolling over or positioning workpieces. The apparatus consists of two conveyor belt surfaces arranged to rotate a workpiece supported on a first conveyor surface in a vertical plane. The apparatus eliminates the need for complicated hoisting or lifting devices to position the workpiece or operations to be performed thereon. The apparatus can also include an electromagnet for retaining the workpiece on a first conveyor surface when it is being worked on. The apparatus may also include the ability to adjust a second conveyor surface which improves the stability of the workpiece when worked on in an inclined position.

11 Claims, 3 Drawing Figures

WORKPIECE ROLLOVER APPARATUS

BACKGROUND OF THE INVENTION

1. Field of the Invention

This invention relates generally to conveyors or article orientation devices. More specifically, this invention relates to a two-surface conveyor system for rolling a workpiece supported thereon to a desired orientation.

2. Description of the Prior Art

When working on large, heavy, bulky articles, it is often necessary to change the position of the articles to expose different surfaces for operations to be performed thereon. In order to accomplish this task, the articles are usually picked up or hoisted with a suitable crane or lifting device and rolled or positioned as required. An example of such a situation is in finishing large castings which need to have different surfaces exposed for grinding or cleaning. Hoisting the castings to perform grinding or cleaning is time consuming, expensive and clumsy. In addition, the size of the work station needed to perform this operations must be increased to accommodate specialized hooks, bales and fixtures which may be required for positioning the castings.

Various conveyor systems are known for handling bulk materials or individual articles. In particular, moving belt or roller systems are well known which alter the orientation of identical articles. Conveyor machinery for accomplishing such tasks are shown in U.S. Pat. No. 4,122,938, issued to Walz, disclosing a conveyor belt system for toppling articles, U.S. Pat. No. 4,156,482 issued to Tomlinson et al depicting machinery for stacking clay tiles, and U.S. Pat. No. 3,944,063 issued to Lederer, illustrating a conveyor and belt assembly for turning over clay pots. The machinery of these prior art patents is specifically designed to accommodate articles which are uniform in shape and conform to one set of dimensions.

Accordingly, it is an object of the present invention to provide a general purpose apparatus for rolling over or orientating articles of varying geometry.

It is a further object of this invention to provide an apparatus for positioning large, heavy workpieces without hoisting loads.

A yet further object of this invention is to provide an apparatus for freely supporting and imparting controlled rotation to a workpiece.

Yet another object of this invention is to provide a simple means of securing ferromagnetic articles on a rollover or orientation apparatus.

SUMMARY OF THE INVENTION

In brief summary, this invention consists of a two-surface conveyor system that simultaneously imparts an essentially perpendicular pair of forces on an article, thereby causing rotation of the article. The article or workpiece is primarily supported and frictionally engaged by a first conveyor surface. Advancing the first conveyor causes the article to contact a second conveyor surface. The second conveyor surface can be advanced away from the first conveyor surface as the workpiece is pushed in contact thereto to impose a second, generally upward, force on the workpiece, perpendicular to the force imposed by the first conveyor surface. These two forces act to rotate the workpiece. When the workpiece is rotated to a desired position, movement of the belts is stopped and frictional contact between the conveyor surfaces and the workpiece hold the workpiece in the desired position.

In a more specific embodiment, the conveyors are made up of endless belt and roller systems. The belt system of the first conveyor has a substantially flat section at least equal to the largest dimension of the workpiece along the plane of belt movement. The belt system for each conveyor system may be independent of the other conveyor or part of a common belt system driven by a single motor-brake unit. Rollers for tensioning and supporting the belt sections can be rigid or flexible. Flexible rollers include spring-type rollers which allow the weight of the supported article to define a concavity on the belt surface. Spring type rollers would also serve to dampen impact of the workpiece with belt surface as it tumbles to desired orientation. In the case of rigid rollers, the same dampening effect may be achieved by placing a suitable cushioning material over the outer surface of the roller.

In a yet further embodiment of this invention, one or more electromagnets are positioned under either or both belt sections to support the belt section and impart a restraining force on a metallic workpiece when motion of the belts is stopped.

Additional details, embodiments and arrangements are discussed in the following detailed description.

DETAILED DESCRIPTION OF THE PREFERRED EMBODIMENT

Figure 1:
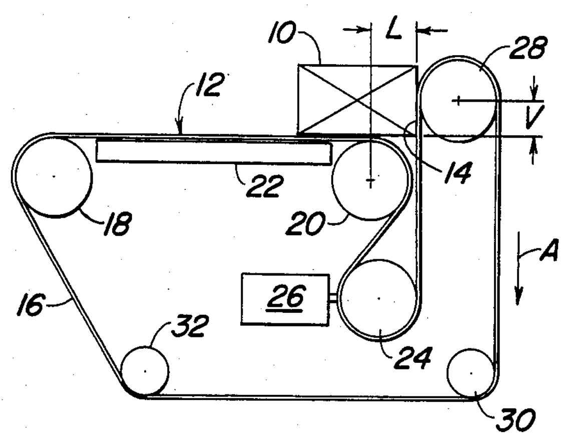
FIG. 1 shows a cross-sectional view of one arrangement of the conveyor system of this invention.

In its simpliest form, this invention consists of two conveyor surfaces which impart a pair of essentially perpendicular loads to a workpiece. Looking at FIG. 1, a ferromagnetic workpiece 10 rests on a horizontal conveyor surface 12, movement of which urges the workpiece into a vertical conveyor surface 14. FIG. 1 also shows the conveyor drums, belts and motor unit which are used to drive the conveyor surfaces and are hereinafter explained in more detail. The motor unit, rollers and belts are shown in simplied form without the various bearings and support structures, the design of which are well known to those skilled in the art and have been omitted to lend clarity to the specification.

Looking in more detail at horizontal conveyor surface 12, this is formed by a section of a conveyor belt 16 between leading and trailing belt rollers 18 and 20 respectively. Rollers 18 and 20 in the preferred embodiment are essentially cylindrical in shape and therefore keep the section of belt forming conveyor surface 12 essentially flat. Keeping the workpiece section of supporting conveyor 12 flat maximizes belt contact with the flat side of workpiece 10 and allows more holding power to be developed on the workpiece 10 by an electromagnet 22 located below conveyor surface 12 and hereinafter described in more detail. The length of the horizontal conveyor surface 12 between rollers 18 and 20 at least exceeds the longest workpiece dimension lying thereacross. In order to accomodate workpieces having curved surfaces or as a means of retaining workpieces on conveyor surface 12, rollers 18 and 20 in other embodiments may be of a complex geometry forming side ramps or have a curvature giving conveyor surface 12 a concave profile.

As belt 16 continues past roller 20, it wraps around a driven roller 24. Roller 24 is driven by a motor-reducer-brake unit 26 which controls motion of the belt. Drive unit 26 provides power to roller 24 to move the belt and advance both the horizontal and vertical conveyor surfaces. Unit 26 also serves as a brake to rapidly stop belt 16 upon command. The motor unit is capable of driving the belts at speeds on the order of 30 feet per minute. A manually or mechanically operated actuator or switch mechanism (not shown) controls the motor unit. Roller 24 also serves as a direction change element upon which belt 16 is turned upward.

At its highest elevations, belt 16 wraps around an upper roller 28 to define vertical conveyor surface 14. The horizontal spacing between upper roller 28 and trailing roller 20 along with the radius of trailing roller 20 will determine horizontal length L between the two conveyor surfaces over which the bottom of the workpiece does not contact belt 16. It is desirable to minimize this uncontacted length to reduce slippage and abrasion between the workpiece and the belt. Thus, dimension L may limit the minimum size of workpiece used on the rollover apparatus. Preferably, length L will not exceed half of the minimum workpiece dimension along the line of dimension L. The vertical distance between the top of conveyor surface 12 and the centerline of upper roller 28, labeled V on FIG. 1., provides the vertical contact length of conveyor surface 14. When rolling workpiece 10, dimension V must be adequate to prevent the workpiece from rising up and being carried over upper roller 28. Nevertheless, it is within the contemplation of this invention that the vertical distance V may be varied to accommodate changing workpiece dimensions and to permit workpiece transport over upper roller 28 and away from the rollover apparatus when desired. In order to vary distance V, roller 28 can be adjusted upward or downward. Workpieces transported over roller 28 could drop into a holding area or onto another conveyor (not shown).

Belt 16 completes its circle back to roller 18 by passing over a rearward roller 30 and a forward roller 32. Tensioning devices well known to those skilled in the art may be added to roller 30 or 32 for providing the desired amount of tautness and load support at conveyor surfaces 12 and 14. These rollers may further be designed to maintain a constant tension on the belt as upper roller 28 is adjusted upward or downward to vary the vertical contact length. In this embodiment, roller 30 imparts a constant downward loading and is free to move vertically under constraint of belt 16.

As mentioned previously, electromagnet 22 is placed underneath horizontal conveyor surface 12. This magnet can be of any type well known to those skilled in the art which will provide adequate force for holding the workpiece stationary while undergoing manufacturing operations. The electromagnet is linked to the motor reducer brake unit, such that the electromagnet is automatically energized when the belts are stopped and deenergized when the belts are moving.

Figure 2:
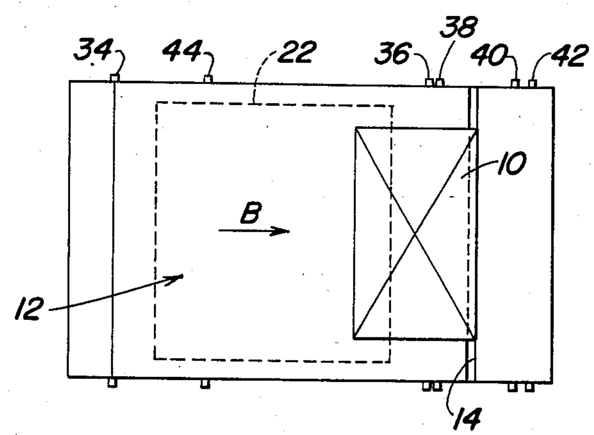
FIG. 2 is a plan view of the conveyor system of FIG. 1.

A plan view showing the workpiece on the roller assembly of this invention is shown as FIG. 2. Workpiece 10 rests on horizontal conveyor surface 12 which urges the workpiece into contact with vertical conveyor surface 14. The width of vertical conveyor surface 14 perpendicularly traverses the path, indicated by the letter B, of horizontal conveyor surface 12. FIG. 2 also shows an outline of electromagnet 22 and shaft ends 34, 36, 38, 40, 42 and 44 from which leading roller 18, trailing roller 20, driven roller 24, upper roller 28, rearward roller 30 and forward roller 32 are supported, respectively.

OPERATION

In order to more fully describe the operation of the rollover device disclosed herein, the action of the belts and the electromagnet and the movement of the workpiece will be described in changing the position of workpiece 10.

The workpiece is initially placed or transferred onto the top of conveyor surface 12. In order to rotate workpiece 10, motor unit 26 is activated to advance belt 16 in the direction of arrow A. Friction forces between vertical surface 14 and workpiece 10 urge the part upward to initiate rotation of the workpiece and are assisted by friction force from conveyor 12 on the bottom of workpiece 10. Rotation may continue until the workpiece has the desired orientation. This may mean rotating the workpiece until it has come to rest on a side from which it will be stablely supported on the horizontal conveyor surface 12, or rotating the workpiece 10 into an inclined position (see FIG. 3) in which it is supported simultaneously by conveyor surfaces 12 and 14.

If the part has been brought to rest such that it can be stablely supported on conveyor surface 12 without any support from the vertical conveyor surface 14 or roller 28, the workpiece may be either left in a position adjacent vertical conveyor surface 14 or belt 16 may be moved in a direction opposite arrow A to center the workpiece over electromagnet 22. Centering the workpiece over electromagnet 22 increases the restraining force that can be developed by the magnet. In addition, moving the workpiece away from conveyor surface 14 and roller 28 provides additional access around the workpiece to facilitate performance of operations thereon.

Figure 3:
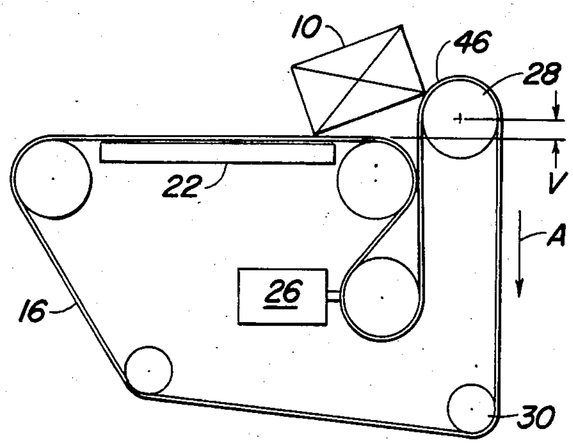
FIG. 3 is a cross-sectional view with the conveyor system of FIG. 1 in an altered condition.

Holding the workpiece in an inclined position can facilitate the performance of other operation on the workpiece. The workpiece may be inclined by resting its raised end against vertical conveyor surface 14. The ability to hold a workpiece in an inclined position is improved by adjusting the elevation of roller 28. Where a small angle of inclination is desired for the workpiece 10, roller 28 may be adjusted downward such that the leading edge of the workpiece will rise up and come to rest on curved surface 46 of roller 28. FIG. 3 shows the conveyor system with roller 28 moved downward relative to its position in FIG. 1. In order to accommodate the excess length of belt, rearward roller 30 moves downward relative to forward roller 32. When the workpiece is brought on top of roller 28, further adjustments in angle of the workpiece may be made by changing the elevation of roller 28 or moving belt 16. By allowing the workpiece to rise up on roller 28, the stability of the inclined workpiece is improved over the situation where the raised end of the workpiece rests against vertical conveyor surface 14.

Although the rollover apparatus of this invention has been described in the context of a specific embodiment, those skilled in the art are well aware of other arrangements and modifications that may be employed in practicing this invention. Accordingly, the specific embodiment described above is not meant to limit the invention to the details disclosed herein.

I claim:

1. An apparatus for positioning an article comprising:

conveyor means having first and second conveyor sections said first conveyor section being advanceable along a predetermined path and at least partially supporting said article;

said second conveyor section being located above and perpendicularly traversing the path of said first conveyor section, said second conveyor section having a path of travel at a substantially right angle to said first conveyor section, said article being conveyed simultaneously by said first and second conveyor sections, whereby said article can be rolled to a desired orientation by said conveyor sections; and means for advancing said first conveyor section toward said second conveyor section, said second conveyor section away from said first conveyor section, and simultaneously stopping and holding said article motionless.

2. The apparatus of claim 1 wherein said first conveyor section is flat over an area having dimensions exceeding the greatest dimension of said article.

3. The apparatus of claim 1 wherein said article is ferromagnetic and said means for stopping and holding said article includes means for inducing a magnetic retaining force on said article.

4. A conveyor belt assembly for positioning a workpiece, said assembly comprising: a conveyor belt;

a first section of said belt at least partially supporting said workpiece and movable along a substantially horizontal line of travel;

a second section of said belt positioned above said first belt section and transverse to said substantially horizonital line of travel said second belt section being movable along a substantially vertical line of travel, and having a location allowing simultaneous contact of said workpiece with said first and second belt sections; whereby said article can be rolled to a desired orientation by said belt sections; and means for simultaneously, advancing said first belt section toward said second belt section and said second belt section away from said first belt section, and simultaneously preventing motion of both belt sections.

5. The assembly of claim 4 wherein said first belt section is substantially flat in a direction along said substantially horizontal line of travel for a distance at least equal to greatest dimension in a plane containing said workpiece and said line.

6. The assembly of claim 5 wherein the flat portion of said belt is partially supported by an electromagnet.

7. The assembly of claim 6 wherein said electromagnet is automatically energized when said sections are stopped and automatically deenergized when said sections are advanced.

8. The conveyor system of claim 4 wherein the upper end of said second conveyor belt section is upwardly and downwardly adjustable.

9. The conveyor system of claim 8 wherein said second conveyor belt section partially wraps a roller at its upper end, said roller being movable along said substantially vertical line of travel.

10. A conveyor belt assembly for positioning a workpiece, said assembly comprising:

an endless conveyor belt;

a motor-reducer brake unit for advancing and stopping said belt;

a first set of parallel rollers defining a first horizontal conveyor belt section;

a second set of parallel rollers defining a second vertical conveyor belt section extending above said first conveyor belt section and located to allow simultaneous contact of said workpiece with said first and second belt sections, whereby said workpiece can be rolled to a desired orientation by said belt sections, said second set of rollers having an upwardly or downwardly adjustable top roller, and said belt being maintained under tension.

11. The conveyor belt assembly of claim 10 wherein an electromagnet is positioned underneath said horizontal conveyor belt section.

* * * * *